US006913689B2

(12) United States Patent
Portman (10) Patent No.: US 6,913,689 B2
(45) Date of Patent: Jul. 5, 2005

(54) METHODS AND APPARATUS FOR REMOVING SEDIMENT FROM A LIQUID USING PULSES OF PRESSURIZED AIR

(76) Inventor: Ervin F. Portman, 101 Fern Bluff Way, Cary, NC (US) 27511

( * ) Notice: Subject to any disclaimer, the term of this patent is extended or adjusted under 35 U.S.C. 154(b) by 213 days.

(21) Appl. No.: 10/163,764

(22) Filed: Jun. 5, 2002

(65) Prior Publication Data

US 2002/0185458 A1 Dec. 12, 2002

Related U.S. Application Data

(60) Provisional application No. 60/296,794, filed on Jun. 8, 2001.

(51) Int. Cl.[7] .............................................. B24C 9/00
(52) U.S. Cl. ..................... 210/99; 210/104; 210/135; 210/171; 210/195.1; 210/512.3; 210/513; 209/138; 209/139.1; 209/140; 451/87; 451/88; 96/415; 96/416
(58) Field of Search ...................... 210/99, 104, 135, 210/171, 195.1, 512.3, 513; 451/87, 88; 209/139.1, 138, 140, 3; 96/415, 416

(56) References Cited

U.S. PATENT DOCUMENTS

| | | | |
|---|---|---|---|
| 4,105,420 A | * | 8/1978 | Moore .......................... 96/416 |
| 4,772,293 A | * | 9/1988 | Bugden et al. ............. 29/623.1 |
| 4,872,975 A | | 10/1989 | Benson |
| 5,127,199 A | * | 7/1992 | Blankers et al. .............. 451/40 |
| 5,979,663 A | | 11/1999 | Herrmann et al. |
| 6,638,420 B2 | * | 10/2003 | Tyllila ......................... 210/86 |

FOREIGN PATENT DOCUMENTS

| | | |
|---|---|---|
| WO | WO 99/55492 | 11/1999 |
| WO | WO 01/14102 | 3/2001 |

OTHER PUBLICATIONS

*Multiservice Procedures for Well–Drilling Operations*, Field Manual No. 5–484, Navy Facilities Engineering Command Pamphlet No. 1065, Air Force Manual No. 32–1072, pp. 4–1–4–14 (Mar. 8, 1994).

* cited by examiner

*Primary Examiner*—Minh-Chau T. Pham
(74) *Attorney, Agent, or Firm*—Myers Bigel Sibley & Sajovec, P.A.

(57) ABSTRACT

Methods and apparatus for removing sediment from a liquid are provided. Pulses of pressurized air are directed into a conduit having an inlet disposed within a first liquid-containing vessel adjacent to (or within) the sediment to cause a slurry of liquid and sediment to flow through the conduit into a second vessel elevated above the first vessel. The slurry of liquid and sediment is allowed to drain from the second vessel into a third vessel that is positioned at an elevation lower than the second vessel. Liquid is drained from the third vessel (to another vessel or elsewhere) as sediment accumulates within the third vessel. The third vessel may be removed when accumulation of sediment therewithin reaches a predetermined amount. The accumulated sediment within the third vessel is removed and the third vessel is returned to service, or another empty vessel may be substituted therefor.

38 Claims, 12 Drawing Sheets

METHODS AND APPARATUS FOR REMOVING SEDIMENT FROM A LIQUID USING PULSES OF PRESSURIZED AIR

RELATED APPLICATION

This application claims the benefit of U.S. Provisional Application No. 60/296,794 filed Jun. 8, 2001, the disclosure of which is incorporated herein by reference in its entirety as if set forth fully herein.

FIELD OF THE INVENTION

The present invention relates generally to sediment removal and, more particularly, to methods and apparatus for removing sediment from liquid.

BACKGROUND OF THE INVENTION

Abrasive jet cutting machines are used in many industries for machining various types of products and materials. An abrasive jet cutting machine mixes abrasive material, such as garnet, with high pressure fluid (e.g., water) flowing at a high rate of speed. After a machining operation, the abrasive fluid typically accumulates in a catcher tank where the abrasive material settles to the bottom. Over time, the amount of abrasive material in the catcher tank builds up and must be removed. Removing the abrasive material by conventional methods such as manual shoveling or vacuum suction typically involves shutting the jet cutting machine down, which may be economically undesirable.

U.S. Pat. Nos. 4,872,975 (the '975 patent) and 5,979,663 (the '663 patent) describe methods for continuously separating and recovering abrasive material without requiring that the jet cutting equipment be shut down. The method proposed by the '975 patent involves separating abrasive material from a slurry via a centrifugal pump and settling tank. The centrifugal pump separates some of the abrasive from the slurry via centrifugal force and the settling tank is used to separate the remaining abrasive material. Unfortunately, centrifugal pumps are generally not recognized as being reliable when handling abrasive materials. Centrifugal pumps may be susceptible to wear and clogging in the presence of abrasive materials, which may require significant and costly maintenance.

The '663 patent describes a method for recovering garnet using a diaphragm pump and coarse filter. Although generally recognized as being more effective at handling solids than centrifugal pumps, diaphragm pumps may also be susceptible to wear and clogging in the presence of abrasive material, which may require significant and costly maintenance.

International Patent Application Nos. WO 99/55492 and WO 01/14102 describe respective methods of using gas bubbles injected into an arrangement of conduits to move a slurry mixture of garnet and water into a settling container. Unfortunately, the proposed arrangements of conduits is somewhat complex, and utilizes multiple horizontal runs and elbows which can become obstructed with abrasive material. Typically, a back-flushing operation is required to remove clogs from the conduit.

The principal of using compressed air bubbles to lift water from a well or other source is well documented (e.g., see Section 4—4 of US Army Field Manual FM 5-484 dated Mar. 8, 1994).

SUMMARY OF THE INVENTION

The present invention utilizes a system of controlled air pulses and a passive collection system to continuously remove solids and other types of materials (e.g., sediment) that have settled to the bottom of a vessel (e.g., a waterjet catcher tank) or other liquid-containing basin. Embodiments of the present invention can overcome the limitations of prior art methods for removing abrasive material described above by eliminating the need for centrifugal or diaphragm pumps and horizontal conduits, valves and tank penetrations.

Embodiments of the present invention utilize controlled pulses of pressurized air into a single extraction device or multiple extraction devices for conveying a slurry of fluid and sediment (e.g., garnet/abrasive material) to one or more holding and/or settling reservoirs. The garnet/abrasive material can be emptied from the reservoir or recycled using various methods. Embodiments of the present invention may require no moving parts that are exposed to abrasive material flow. Moreover, centrifugal or diaphragm pumps are not required, thereby reducing equipment down time and maintenance requirements.

According to embodiments of the present invention, an apparatus for removing sediment (e.g., abrasive material such as garnet) from a liquid (e.g., water) includes a first vessel disposed at a first elevation, a second vessel disposed at a second elevation that is higher than the first elevation, a third vessel disposed at a third elevation that is lower than the second elevation, and a fourth vessel at fourth elevation that is lower than the third elevation. The first vessel contains a liquid and a layer of sediment therewithin. A first conduit defines a first fluid path between an inlet and an outlet. The first conduit inlet is positioned adjacent to (or within) the layer of sediment and the first conduit outlet is in fluid communication with the second vessel.

According to embodiments of the present invention, a penetration stop may be secured to the first conduit and may be utilized to limit how far the first conduit inlet extends into the layer of sediment. According to embodiments of the present invention, the penetration stop rests on top of the sediment in the first vessel.

An air source directs pulses of pressurized air into the first conduit to cause a slurry of liquid and sediment to flow through the first conduit into the second vessel. A second conduit defines a second fluid path between an inlet in fluid communication with the second vessel and an outlet in fluid communication with the third vessel. The second conduit is configured to drain a slurry of liquid and sediment from the second vessel into the third vessel.

The fourth vessel is configured to receive liquid from the third vessel. A third conduit defines a third fluid path between an inlet in fluid communication with the third vessel and an outlet in fluid communication with the fourth vessel. The third conduit is configured to drain liquid from the third vessel into the fourth vessel as sediment accumulates within the third vessel. A fourth conduit defines a fourth fluid path between an inlet in fluid communication with the fourth vessel and an outlet in fluid communication with the first vessel. The fourth conduit is configured to drain liquid from the fourth vessel into the first vessel.

A fifth conduit defines a fifth fluid path between an inlet in fluid communication with the second vessel and an outlet in fluid communication with the first vessel. The fifth conduit serves as a pressure relief conduit for the second vessel.

According to embodiments of the present invention, the first conduit is a vertically-oriented, elongated tube having an inlet on one end and an outlet on the opposite end. The outlet is in fluid communication with the second vessel that is elevated above the first vessel. The elongated tube may be movably secured within the first vessel. For example, the elongated tube may be moved manually, or may be configured to move automatically.

According to embodiments of the present invention, the first vessel may include one or more pairs of generally horizontal slats that extend across the first vessel from one side to an opposite side thereof. The slats in each pair are preferably spaced apart so as to form a slot. The elongated tube may be moved periodically along the slot either manually or automatically.

According to embodiments of the present invention, one of the slats extending across the first vessel may include a first set of ratchet teeth disposed on an upper surface thereof. A support member for movably securing the elongated tube within the first vessel may include a second set of ratchet teeth that are configured to matingly engage with the first set of ratchet teeth. Vibration of the first conduit caused by pulsed air flow through the first conduit causes the second set of ratchet teeth to move along the first set of ratchet teeth at a predetermined speed. Accordingly, the elongated tube may be configured to move along a predetermined direction automatically.

The first conduit inlet may include one or more nozzles having various shapes, sizes and configurations. According to embodiments of the present invention, a nozzle assembly is provided that is in fluid communication with the first conduit inlet. The nozzle assembly includes a body, a plurality of circumferentially spaced-apart apertures formed within the body, and a plurality of passageways, wherein each passageway is in fluid communication with a respective aperture and with the first conduit fluid path. The nozzle assembly configuration is designed to create a vortex within the first conduit inlet which can facilitate sediment removal and can reduce the possibility of clogging.

According to embodiments of the present invention, a portion of one or more of the various conduits and vessels may be transparent such that flow therethrough and/or therein can be observed.

According to embodiments of the present invention, a sixth conduit may be provided to prevent clogging of the first conduit inlet. The sixth conduit includes an outlet positioned adjacent to the first conduit inlet and is configured to deliver pressurized fluid and/or air adjacent the first conduit inlet.

According to embodiments of the present invention, an apparatus for removing sediment contained within a volume of liquid is provided. Apparatus includes a vessel comprising an inlet and an outlet; an elongated, substantially linear first conduit comprising an inlet and an outlet, wherein the first conduit inlet is configured to be positioned adjacent to (or within) a layer of sediment within a volume of liquid, and wherein the first conduit outlet is in fluid communication with the vessel via the vessel inlet; an air source that is configured to direct pulses of pressurized air into the first conduit to draw a slurry of liquid and sediment through the first conduit and into the vessel; and a second conduit in fluid communication with the vessel via the vessel outlet, wherein the second conduit is configured to drain a slurry of liquid and sediment from the vessel.

According to embodiments of the present invention, a method for removing sediment (e.g., abrasive material such as garnet) from a liquid (e.g., water) contained within a first vessel includes the following steps: directing pulses of pressurized air into a conduit having an inlet disposed within the first vessel adjacent to (or within) the sediment to cause a slurry of liquid and sediment to flow through the conduit into a second vessel elevated above the first vessel, draining the slurry of liquid and sediment from the second vessel into a third vessel that is positioned at an elevation lower than the second vessel, and draining liquid from the third vessel (to another vessel or elsewhere) as sediment accumulates within the third vessel. The third vessel may be removed when accumulation of sediment therewithin reaches a predetermined amount. The accumulated sediment within the third vessel is removed and the third vessel is returned to service, or another empty vessel may be substituted therefor.

According to embodiments of the present invention, the conduit is periodically moved along a predetermined path within the first vessel. Movement may be manual or automatic. For example, the conduit may be moved along the predetermined path in response to the pulses of pressurized air flowing through the conduit.

According to embodiments of the present invention, pressurized air and/or fluid may be directed into the sediment adjacent to the conduit inlet substantially simultaneously with the step of directing pulses of pressurized air into the conduit.

An advantage of the present invention is that the slurry flow path upwardly through the conduit is substantially unobstructed and the pulse action of the pressurized air (or other gas) generates a self-priming and self-clearing action. Moreover, the conduit is substantially straight with no bends. As a result, no back-flushing is required. Further, baffles and valves are not required and a catcher tank does not need to be modified to include penetrations for the conduit. Embodiments of the present invention are also designed to be removable, thereby providing accessibility to normally submerged components not readily accessible in prior art devices.

Embodiments of the present invention are designed to function without the need for an outlet nozzle penetrating a catcher tank or connected piping, which can be susceptible to clogging and may not be readily accessible for cleaning. Eliminating the tank nozzle also may have the benefit that existing catcher tanks need not be modified to include such a nozzle.

There are other inherent economic benefits in applying embodiments of the present invention to the removal of garnet/abrasive from catcher tanks. By eliminating conventional pumps, hard piping and associated maintenance, the system can be more cost effective due to its simplicity and power consumption efficiency.

Embodiments of the present invention are not limited to the removal of abrasive material, such as garnet, from catcher tanks of water jet cutting devices. Other potential applications for embodiments of the present invention include, but are not limited to, pumping sand/water slurry to control erosion, extracting slurry from underground storage tanks, removing sediment from water fountains, removing silt from wells, and removing sediment and other solid materials from various liquid-containing basins.

BRIEF DESCRIPTION OF THE DRAWINGS

The accompanying drawings, which form a part of the specification, illustrate key embodiments of the present invention. The drawings and description together serve to fully explain the invention.

DETAILED DESCRIPTION OF THE INVENTION

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of lines, layers and regions, as well as scale, may be exaggerated for clarity.

Embodiments of the present invention can provide methods and apparatus for removing sediment from various liquid locations (e.g., tanks, vessels, rivers, streams, etc.). As used herein, the term sediment means any material that settles to the bottom of a liquid and includes, but is not limited to, abrasive material from jet cutting processes, silt, sand, mud, clay, etc. According to a specific embodiment of the present invention, methods and apparatus for removing abrasive material, such as garnet, from catcher tanks of water jet cutting machines will be described herein. However, it is understood that embodiments of the present invention may be utilized to remove various other types of sediments from various liquid environments.

Embodiments of the present invention preclude the need for conventional pumps and devices that utilize moving parts which may be subjected to corrosion, erosion and clogging in the presence of abrasive material. All parts of a sediment removal system according to embodiments of the present invention that are exposed to an abrasive material are designed to function without any significant wear and without requiring significant maintenance.

Figure 1:
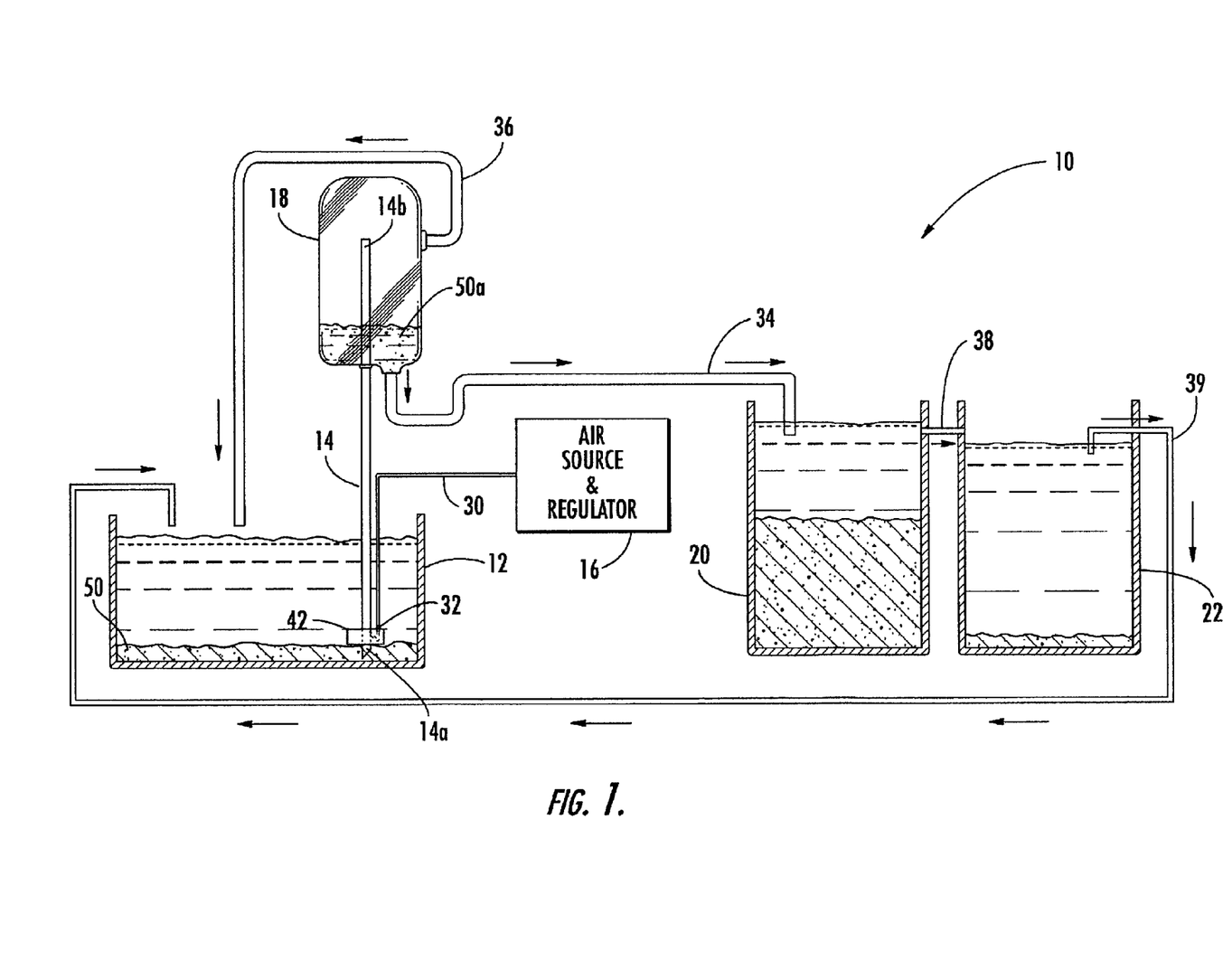
FIG. 1 is a schematic illustration of a sediment removal system according to embodiments of the present invention.

Referring to FIG. 1, a sediment removal system 10 according to embodiments of the present invention is schematically illustrated. The illustrated sediment removal system 10 is configured to remove sediment (in this case, abrasive material) from a catcher tank 12 of a jet cutting machine (not illustrated). The illustrated sediment removal system 10 includes a slurry extraction conduit or tube 14, an air source and regulator 16 for providing pulses of pressurized air (or other gas or fluid), a second vessel referred to as a receiving vessel 18, a third vessel referred to as a primary collection tank 20, and a fourth vessel referred to as a secondary collection tank 22. The slurry extraction tube 14 defines a fluid path 15 between an inlet 14a and an outlet 14b. The inlet 14a is positioned adjacent to (or in) the sediment 50 to be removed and the outlet 14b is in fluid communication with the receiving vessel 18. The slurry extraction tube 14 is designed to be self-priming and self-clearing when positioned adjacent to the abrasive material 50 or when immersed directly into the abrasive material 50 in the catcher tank 12. The slurry extraction tube 14 conveys an abrasive slurry mixture 50a to the receiving vessel 18 via pulses of pressurized air provided and regulated by the air source and regulator 16. The air source and regulator 16 regulates air pressure, air volume, and air pulse cycle time.

Figure 7:
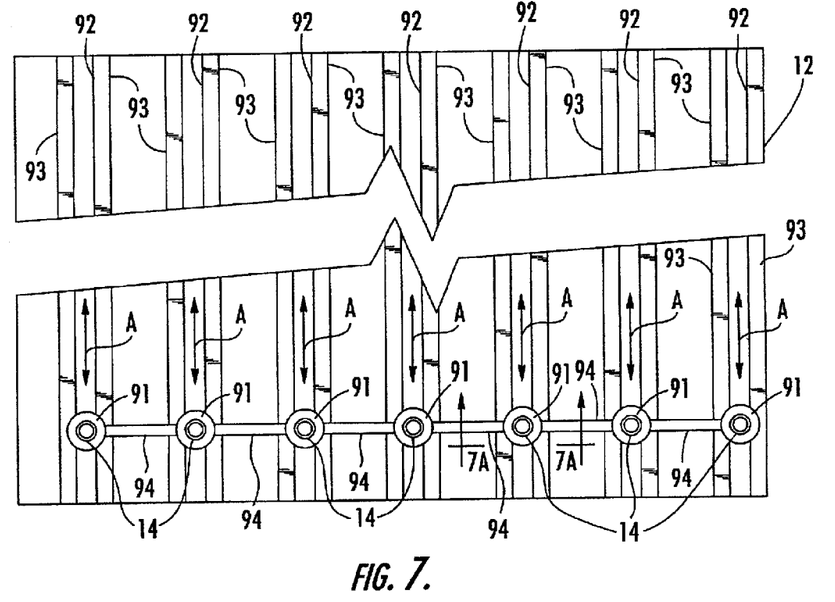
FIG. 7 is a plan view of a liquid and sediment containing vessel having a plurality of pairs of adjacent slats forming slots within which slurry extraction tubes according to embodiments of the present invention are movable.

The linear arrangement of the slurry extraction tube 14 and inlet 14a reduces the likelihood of clogging caused by the abrasive material. In addition, a slurry extraction tube 14 may be configured to be movably inserted within various locations of a catcher tank. Although FIG. 1 illustrates a single slurry extraction tube 14, embodiments of the present invention may utilize multiple slurry extraction tubes as illustrated in FIG. 7. Multiple slurry extraction tubes may be moved individually or collectively within a vessel.

In operation, pulses of pressurized air (or other gas or fluid) are delivered to the slurry extraction tube 14 via tubing 30 from the air source and regulator 16 to nozzle 32. Air pulses may be delivered having an exemplary pressure of between 40 psi and 80 psi and in exemplary time intervals of between about 0.5 seconds and 2 seconds. However, embodiments of the present invention may utilize various pressures and time intervals without limitation.

The slurry extraction tube 14 is inserted within the catcher tank 12 such that the inlet 14a is positioned adjacent to (or immersed within) the abrasive material 50 on the bottom of the catcher tank 12. In the illustrated embodiment of FIG. 2, the nozzle 32 is attached to a penetration stop 42 that limits the distance the inlet 14a of the slurry extraction tube 14 can be extended into the abrasive material 50. Pulses of pressurized air provided into the slurry extraction tube 14 via nozzle 32 force a slurry of water (or other liquid that is in the catcher tank 12) and abrasive material 50 into the receiving vessel 18.

Air pulses directed into the slurry extraction tube 14 draw an abrasive material slurry upward due to the change in specific gravity within the slurry extraction tube 14. Applicants have unexpectedly found that using pulsed air is more effective for moving a slurry of abrasive material than is a steady air stream.

Figure 2:
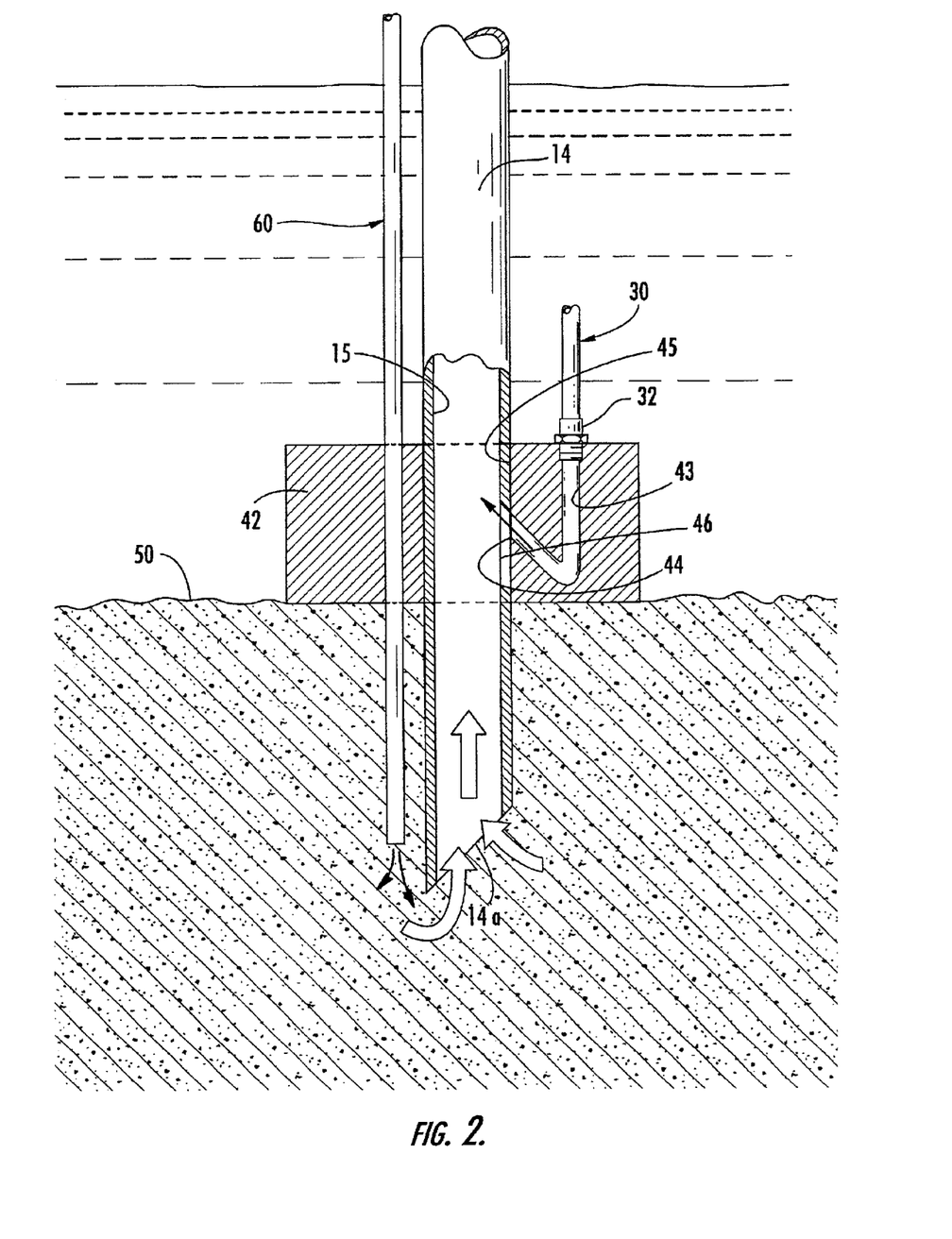
FIG. 2 is an enlarged, cutaway side view of the inlet of a slurry extraction tube according to embodiments of the present invention illustrating an adjacent conduit for directing pressurized air/fluid into the sediment adjacent the slurry extraction tube inlet.

In the illustrated embodiment of FIG. 2, the penetration stop 42 contains a passageway 43 that is in fluid communication with the nozzle 32 and with an aperture 44 in the sleeve inner wall 45 of the penetration stop 42. Aperture 44 is in fluid communication with an elongated aperture 46 formed within the slurry extraction tube 14. Accordingly, air flows into the nozzle 32 through the passageway 43 and into the fluid path 15 of the slurry extraction tube 14 via apertures 44 and 46. Elongated aperture 46 allows the slurry extraction tube 14 to be slidably moved within the penetration stop 42, while maintaining fluid communication with air flowing through passageway 43.

In the illustrated embodiment, the slurry extraction tube 14 is slidably supported within the penetration stop 42. Accordingly, the extent to which the inlet 14a can be inserted into the abrasive material can be controlled by sliding the slurry extraction tube 14 within the penetration stop 42. Air pulses are provided within the slurry extraction tube 14 as described above via nozzle 32 which is fluid communication with the air source and regulator 16 via air supply conduit 30.

Figure 6A:
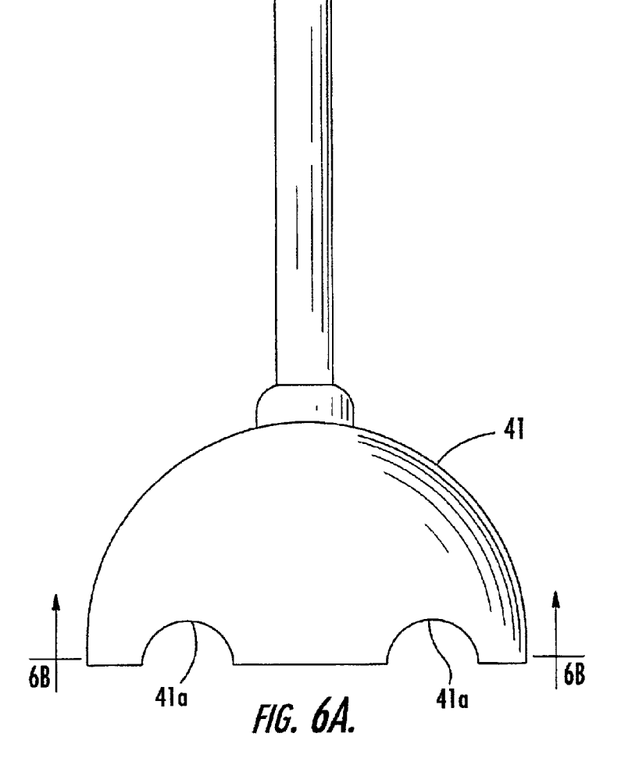
FIG. 6A is an enlarged, partial side view of a nozzle assembly at the slurry extraction tube inlet, according to embodiments of the present invention.
Figure 6B:
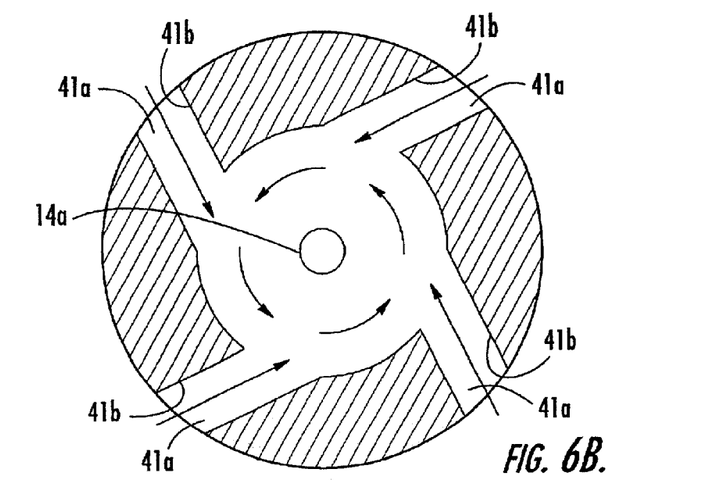
FIG. 6B is a bottom view of the nozzle assembly of FIG. 6A taken along lines 6B—6B.

According to embodiments of the present invention, the inlet 14a of the slurry extraction tube 14 may incorporate one or more nozzles. These nozzles may be removable and changeable and may have various shapes, sizes and configurations. For example, FIGS. 6A–6B illustrate a nozzle assembly according to embodiments of the present invention. The illustrated nozzle assembly includes a plurality of circumferentially spaced-apart apertures 41a formed within a body 41 of the nozzle assembly, and a plurality of eccentrically positioned, radially extending passageways 41b that are configured to create an agitation zone directly below the slurry extraction tube inlet 14a. Each passageway 41b is in fluid communication with a respective aperture 41a and with the first conduit inlet 14a. This configuration is designed to increase the amount of abrasive material in suspension and, thereby, increase removal of abrasive material. FIG. 6B is a bottom end view of the nozzle assembly of FIG. 6A illustrating the configuration of passageways 41a. Although illustrated as a single nozzle, it is anticipated that embodiments of the present invention may utilize multiple inlet nozzles at the inlet 14a. Various inlet nozzle sizes and configurations may be utilized without limitation.

Figure 10:
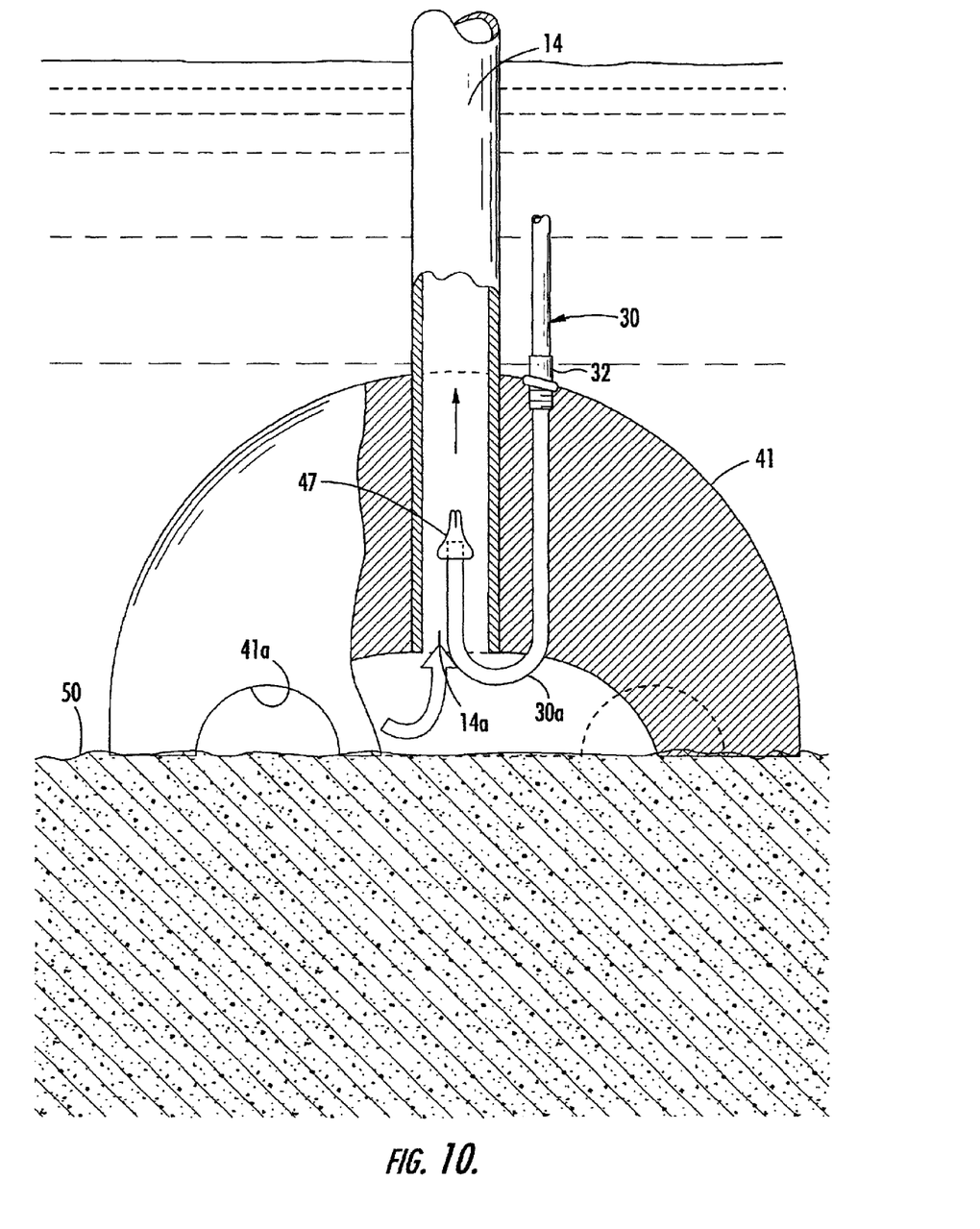
FIG. 10 is an enlarged, cut-away side view of a nozzle assembly at the slurry extraction tube inlet, according to embodiments of the present invention.

FIG. 10 is a partial cut-away view of the nozzle assembly of FIGS. 6A–6B according to embodiments of the present invention and illustrating a slurry extraction tube 14 therein. Air from the air source and regulator 16 is provided via air supply conduit 30 to nozzle 32 and then via air supply conduit extension 30a into the slurry extraction tube inlet 14a. A "duckbill" valve 47 (available from A. C. Hoffman Engineering Inc., 5876 Republic St., Riverside, Calif. 92504) is connected to the end of the air supply conduit extension 30a within the slurry extraction tube inlet 14a to prevent the ingress of abrasive slurry mixture into the air supply conduit extension 30a. Duckbill valves are well known to those skilled in the art and need not be described further herein. Moreover, other mechanisms known to those skilled in the art may be utilized to prevent the ingress of abrasive slurry mixture into the air supply conduit extension 30a.

Figure 11:
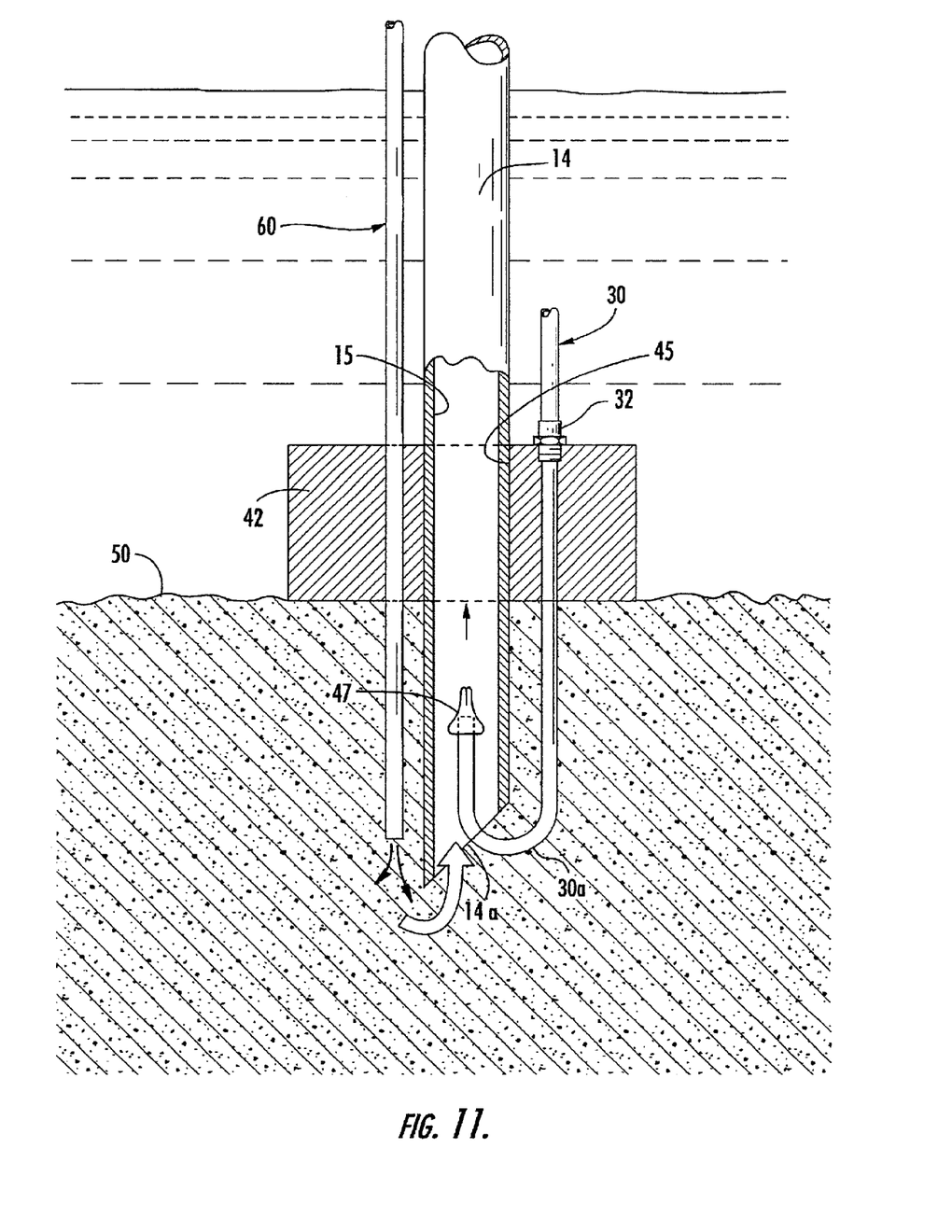
FIG. 11 is an enlarged, cutaway side view of the inlet of a slurry extraction tube according to embodiments of the present invention illustrating an air conduit extension extending through the slurry extraction tube inlet.

FIG. 11 is an enlarged, cutaway side view of the inlet of a slurry extraction tube 14 according to other embodiments of the present invention. Air from the air source and regulator 16 is provided via air supply conduit 30 to nozzle 32 and then via air supply conduit extension 30a into the slurry extraction tube inlet 14a. A duckbill valve 47 is connected to the end of the air supply conduit extension 30a within the slurry extraction tube inlet 14a to prevent the ingress of abrasive slurry mixture into the air supply conduit extension 30a. Other mechanisms known to those skilled in the art may be utilized to prevent the ingress of abrasive slurry mixture into the air supply conduit extension 30a.

Referring back to FIG. 1, the abrasive material slurry 50a within the receiving vessel 18 flows gravimetrically from the receiving vessel 18 into the primary collection tank 20 via conduit 34. According to embodiments of the present invention, the receiving vessel 18, or one or more portions thereof, is formed of transparent material to facilitate visual inspection of its contents. Pressure within the receiving vessel 18 is vented to the catcher tank 12 via a conduit 36.

When abrasive material slurry 50a flows from the receiving vessel 18 into the primary collection tank 20, the abrasive material settles to the bottom of the liquid in the primary collection tank 20. The liquid is drained into the secondary collection tank 22 via an overflow conduit 38 as the abrasive material accumulates in the primary collection tank 20. The primary collection tank 20, thus, fills with abrasive material and can be removed from the system 10 and emptied when full. Water in the secondary collection tank 22 is drained back to the catcher tank 12 via conduit 39.

According to embodiments of the present invention, one or more of the various conduits 34, 36, 38, 39 may be transparent to permit visual inspection of flow therethrough. In addition, one or more of the various conduits 34, 36, 38, 39 may be flexible tubing.

Figure 3:
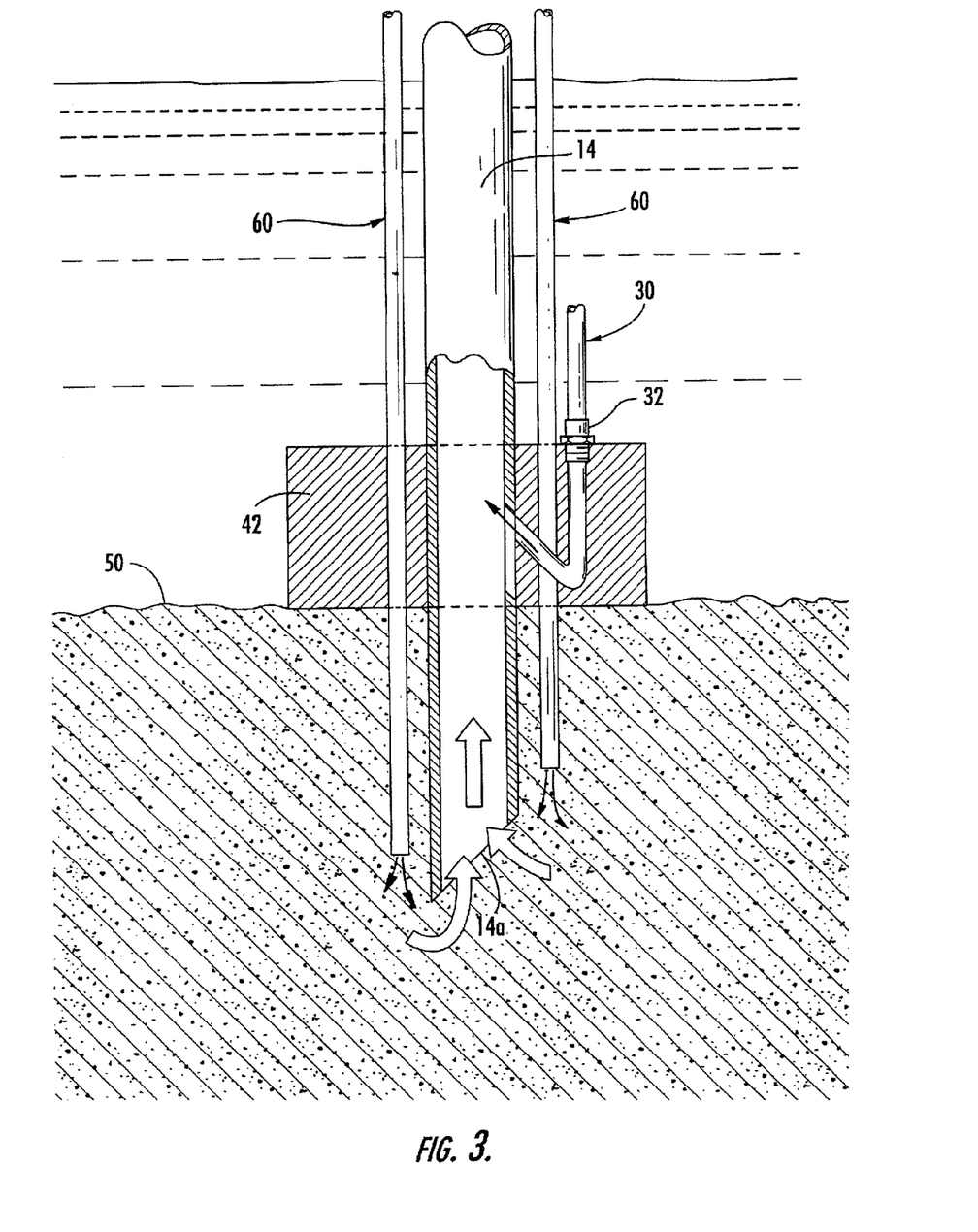
FIG. 3 is an enlarged, cutaway side view of the inlet of a slurry extraction tube according to embodiments of the present invention illustrating multiple adjacent conduits for directing pressurized air/fluid into the sediment adjacent the slurry extraction tube inlet.

According to embodiments of the present invention illustrated in FIGS. 2–3, one or more optional clearing tubes 60 may be utilized to blow pressurized pulses of gas (e.g., air) and/or liquid (e.g., water) directly into the abrasive material 50 adjacent the inlet 14a of the slurry extraction tube 14. If the inlet 14a of the slurry extraction tube 14 is extended too far into the abrasive 50, pressurized liquid and/or gas provided via a clearing tube 60 can clear the inlet 14a (including any nozzles utilized with the inlet 14a) and can initiate the flow of abrasive slurry upwardly into the slurry extraction tube 14. Air flow through a clearing tube 60 may be controlled by the air source and regulator 16.

FIG. 3 illustrates two clearing tubes 60 positioned on respective opposite sides of a slurry extraction tube 14, according to embodiments of the present invention. Each clearing tube 60 may be configured to deliver pressurized gas and/or liquid as described above. Moreover, one clearing tube 60 may be configured to deliver pressurized gas and the other clearing tube 60 may be configured to deliver pressurized liquid.

Figure 4:
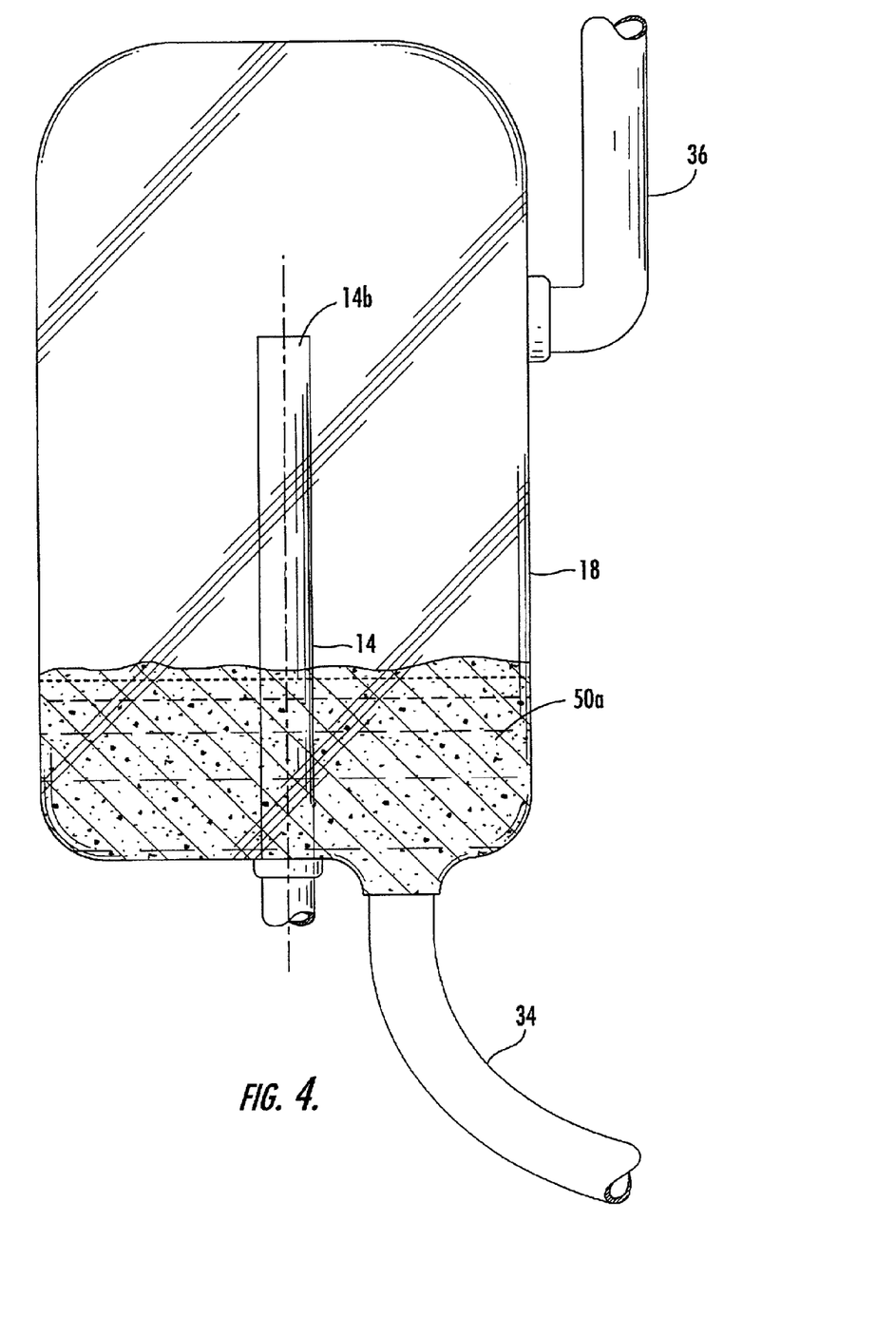
FIG. 4 is a side view of the receiving vessel in the sediment removal system of FIG. 1, according to embodiments of the present invention.
Figure 5:
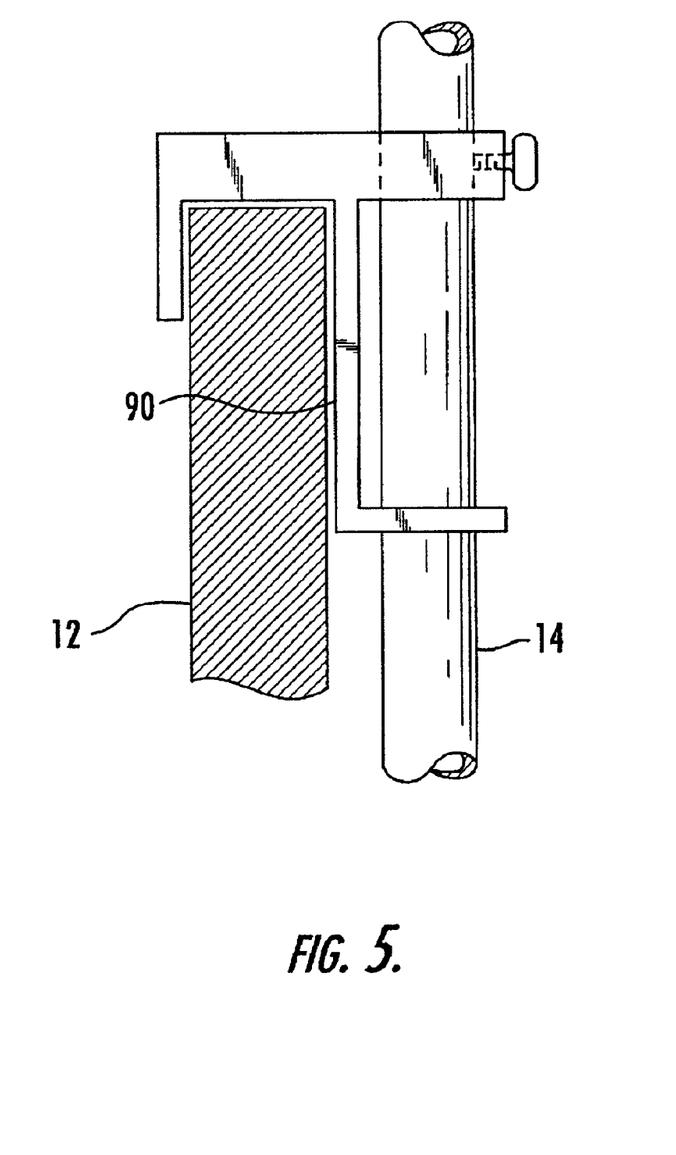
FIG. 5 is a side view of a support bracket for And supporting a slurry extraction tube in the sediment removal system of FIG. 1, according to embodiments of the present invention.

The outlet 14b of the slurry extraction tube extends upwardly into the receiving vessel 18. An enlarged side view of the receiving vessel 18 is illustrated in FIG. 4. The receiving vessel 18 is configured to receive the abrasive slurry from the slurry extraction tube outlet 14b and then allow the abrasive slurry 50a to drain gravimetrically to the primary collection tank 20. According to embodiments of the present invention, the receiving vessel 18 is transparent or has one or more portions that are formed from transparent material (e.g., clear plastic, glass, etc.) to permit inspection of abrasive slurry flow during operation. The receiving vessel 18 may have various shapes, sizes and configurations according to embodiments of the present invention and is not limited to the illustrated embodiment. Moreover, embodiments of the present invention are not limited to the illustrated shapes and configurations of any of the components of the sediment removal system 10.

Referring back to FIG. 1, operations of the illustrated abrasive removal system 10 will now be described. With the inlet 14a of the slurry extraction tube 14 inserted into (or adjacent to) the abrasive material 50, the operation cycle begins as the air source and regulator 16 releases pulses of pressurized air into the nozzle 32 through the supply tube 30. To generate pulses, the air source and regulator 16 may utilize a commercially available solenoid valve, on-off switch, time delay relay or PLC and a filter regulator, as would be understood by those skilled in the art. It should be understood that pulses of pressurized gas other than air may be utilized according to embodiments of the present invention.

The abrasive slurry mixture is directed into the receiving vessel 18. The receiving vessel 18 redirects the abrasive slurry flow to the primary collection tank 20 by gravity through conduit 34. The primary collection tank 20 receives the abrasive slurry and settling of the abrasive material begins. As water (or other slurry liquid) rises in the primary collection tank 20, excess water overflows into the secondary collection tank 22 through conduit 38. The secondary collection tank 22 contains primarily clear water with minor abrasive carry-over which settles to the bottom thereof.

According to other embodiments of the present invention, the secondary collection tank 22 may be eliminated and water or other slurry fluid may be returned directly to the catcher tank 12 or to another location. Alternatively, multiple additional secondary collection tanks 22 may be utilized.

The overflow of water in the secondary collection tank 22 is returned to the catcher tank 12 by gravity through conduit 39. When the primary collection tank 20 is full, or nearly full, of abrasive material, air flow into the slurry extraction tube 14 can be stopped and the primary collection tank 20 can be emptied or replaced with an empty tank.

According to embodiments of the present invention, the slurry extraction tube 14 may be supported on or within the catcher tank 12 in various ways. For example, as illustrated in FIG. 4, a support bracket 90 may be configured to attach the slurry extraction tube 14 to a side wall of a catcher tank 12 or to a slat or other member extending thereacross.

Figure 7A:
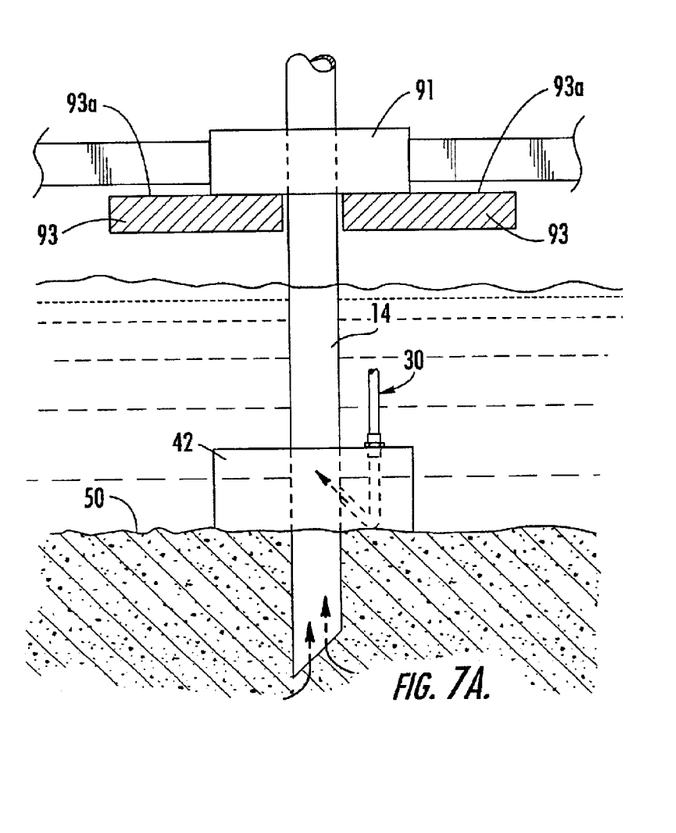
FIG. 7A is a partial side view of a slurry extraction tube of FIG. 7 taken along lines 7A—7A.

Referring to FIGS. 7–7A, a support bracket 91 is configured to support a slurry extraction tube 14 disposed within a slot 92 formed by a pair of spaced-apart, adjacent slats 93 that extend across the catcher tank 12. In the illustrated embodiment, multiple pairs of slats 93 and corresponding slots 92 are provided. A slurry extraction tube 14 is be inserted into the catcher tank 12 through a respective slot 92 and can be moved within the tank 12 as indicated by arrow A, as well as upwardly and downwardly into the contents of the catcher tank.

Various support devices may be utilized to support slurry extraction tubes within tanks and vessels according to embodiments of the present invention. The present invention is not limited to the illustrated support bracket embodiments.

In the illustrated embodiment, the plurality of slurry extraction tubes are movable collectively within slots 92 via connectors 94. However, a plurality of slurry extraction tubes 14 may be moved individually and need not be connected.

Figure 8:
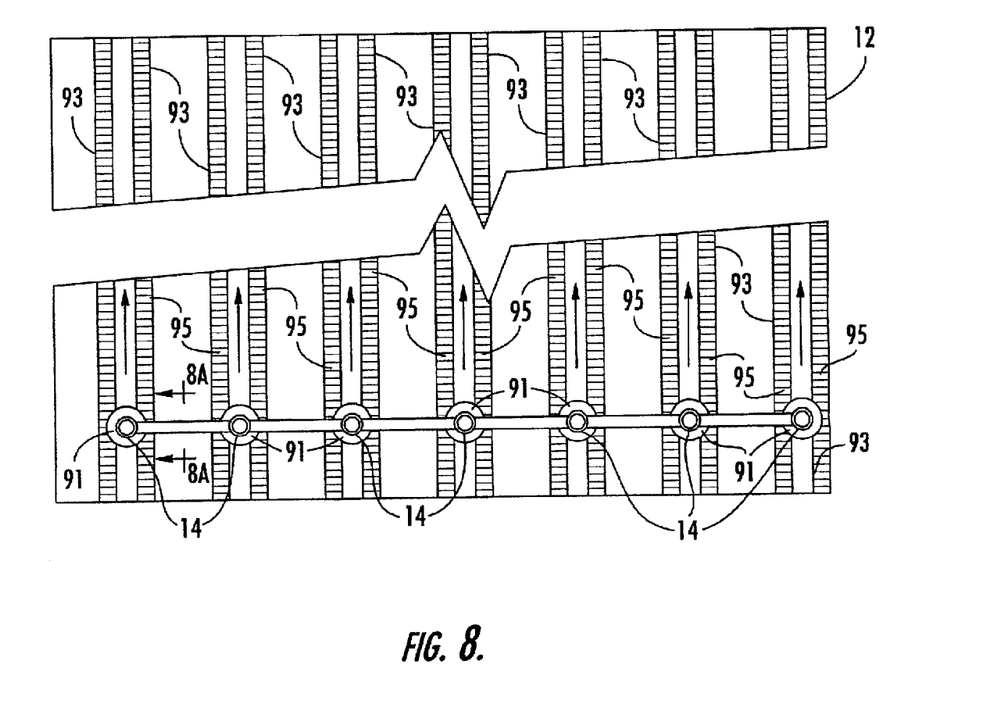
FIG. 8 is a broken plan view of a liquid and sediment containing vessel having a plurality of pairs of adjacent slats forming slots within which slurry extraction tubes according to embodiments of the present invention are movable, and wherein the slurry extraction tubes are configured to move along a predetermined path via respective complimentary sets of ratchet teeth.
Figure 8A:
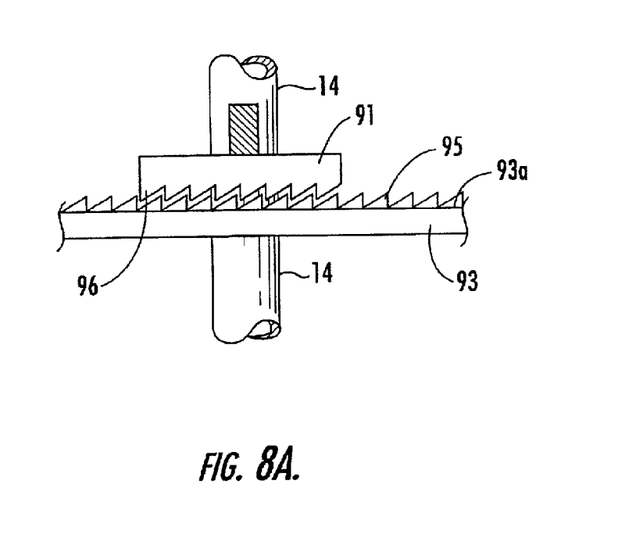
FIG. 8A is a partial side view of a slurry extraction tube of FIG. 8 taken along lines 8A—8A illustrating ratchet teeth engagement between the slurry extraction tube support member and a vessel slat.
Figure 8B:
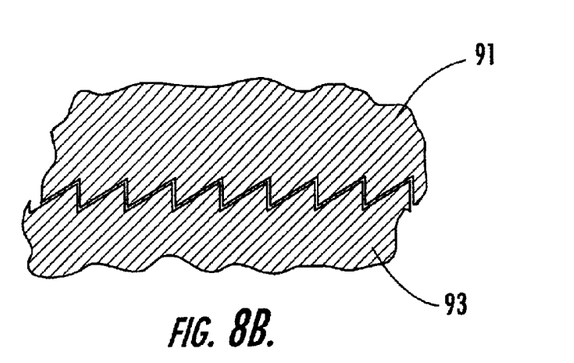
FIGS. 8B–8D illustrate movement of a respective set of ratchet teeth for the embodiment of FIG. 8.
Figure 8C:
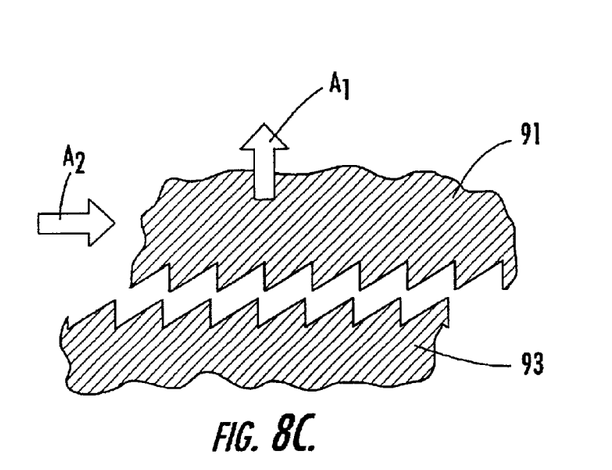
Figure 8D:
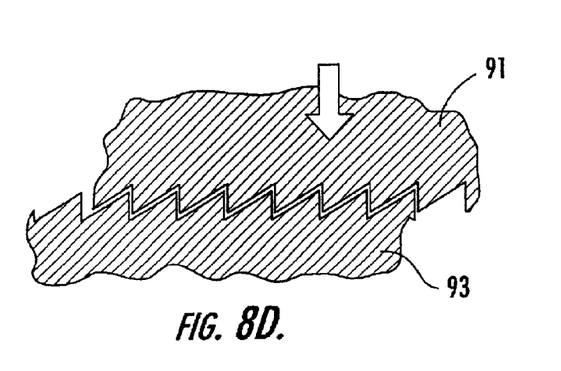

According to additional embodiments of the present invention illustrated in FIGS. 8–8D, slurry extraction tubes 14 may be configured to automatically move within a catcher tank or other vessel. As illustrated in FIGS. 8–8A, each slat 93 includes a set of ratchet teeth 95 on an upper surface 93a thereof. The support bracket 92 may include a corresponding complimentary set of ratchet teeth 96 that are configured to matingly engage the ratchet teeth 95 on the slat 93. Vibration of the slurry extraction tube 14 caused by the pulsing of air therethrough is configured to cause the slurry extraction tube 14 to "walk" along the slat at a predetermined speed. For example, in FIG. 8B, vibration caused by the pulsed air is not enough to lift the support bracket 91 and slurry extraction tube 14 secured thereto. In FIG. 8C, the air pulses have caused enough vibration to cause the support bracket 91 and slurry extraction tube 14 secured thereto to rise upwardly slightly (indicated by arrow $A_1$). The ratchet teeth configuration causes the support bracket 91 to move in a predetermined direction (indicated by arrow $A_2$) by one tooth (or by multiple teeth depending on the ratchet teeth configuration). The ratchet teeth on the support bracket 91 and slat 93 then reengage in mating relationship as illustrated in FIG. 8D until vibration is sufficient to raise the support bracket 91 again.

Figure 9:
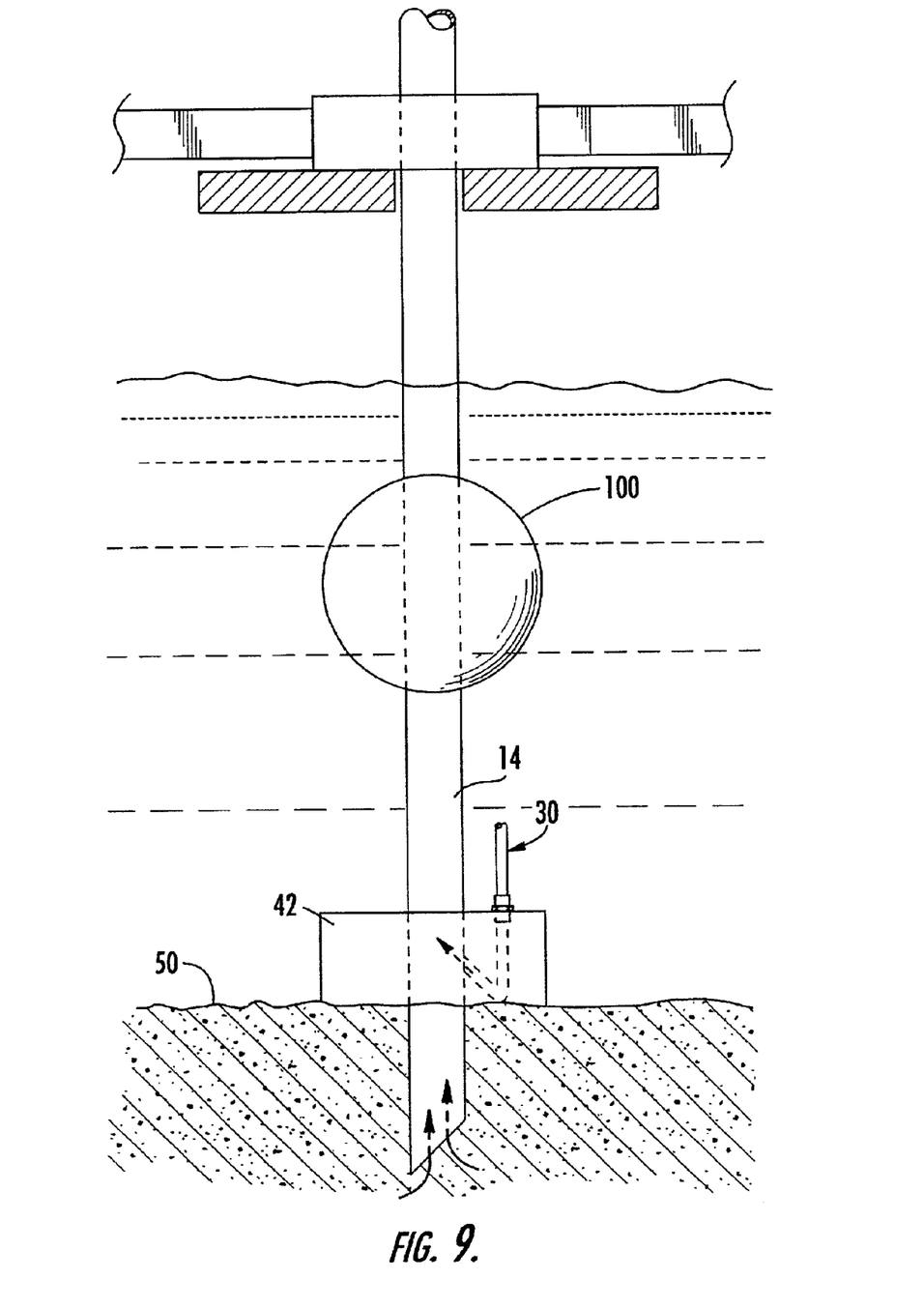
FIG. 9 is a partial side view of a slurry extraction tube having a ballast ball attached thereto, according to embodiments of the present invention.

According to another embodiment of the present invention and illustrated in FIG. 9, a ballast ball 100 may be attached to a portion of a slurry extraction tube 14 that is submerged beneath the water level in a catcher tank. The ballast ball 100 is configured to facilitate buoyancy of the slurry extraction tube 14 such that movement of the slurry extraction tube 14 within a liquid requires reduced force.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An apparatus for removing sediment from a liquid, comprising:

a first vessel disposed at a first elevation, wherein the first vessel contains a liquid and a layer of sediment therewithin;

a second vessel disposed as a second elevation that is higher than the first elevation;

a third vessel disposed at a third elevation that is lower than the second elevation;

a first conduit that defines a first fluid path between an inlet and an outlet, wherein the inlet is positioned adjacent to the layer of sediment within the first vessel and the outlet is in fluid communication with the second vessel, and wherein the first conduit is movably secured within the first vessel;

an air source that is configured to direct pulses of pressurized air into the first conduit to draw a slurry of liquid and sediment through the first conduit into the second vessel; and a second conduit that defines a second fluid path between an inlet in fluid communication with the second vessel and an outlet in fluid communication with the third vessel, and wherein the second conduit is configured to drain a slurry of liquid and sediment from the second vessel into the third vessel.

2. The apparatus of claim 1, further comprising:
a fourth vessel; and
a third conduit that defines a third fluid path between an inlet in fluid communication with the third vessel and an outlet in fluid communication with the fourth vessel, and wherein the third conduit is configured to drain liquid from the third vessel into the third vessel as sediment accumulates within the third vessel.

3. The apparatus of claim 2, further comprising a fourth conduit that defines a fourth fluid path between an inlet in fluid communication with the fourth vessel and an outlet in fluid communication with the first vessel, and wherein the fourth conduit is configured to drain liquid from the fourth vessel into the first vessel.

4. The apparatus of claim 1, further comprising a fifth conduit that defines a fifth fluid path between an inlet in fluid communication with the second vessel and an outlet in fluid communication with the first vessel, wherein the fifth conduit serves as a pressure relief conduit for the second vessel.

5. The apparatus of claim 1, wherein the first conduit comprises a substantially vertical-oriented, elongated tube.

6. The apparatus of claim 1, wherein at least a portion of one or more of the first, second, and third conduits is transparent such that flow therethrough can be observed.

7. The apparatus of claim 1, wherein one or more of the first, second, and third conduits comprise flexible tubing.

8. The apparatus of claim 1, wherein the first conduit is configured to periodically move along a predetermined path within the first vessel.

9. The apparatus of claim 1:
wherein the first vessel comprises an elongated, generally horizontal member that extends between opposite sides of the first vessel, wherein the elongated member comprises an upper surface having a first set of ratchet teeth disposed thereon; and
wherein the first conduit is movably secured within the first vessel via a support member, wherein the support member comprises a second set of ratchet teeth configured to matingly engage the first set of ratchet teeth, and wherein the impulse experienced by the first conduit as a result of pulsed air flow through the first conduit causes the second set of ratchet teeth to move relative to the first set of ratchet teeth.

10. The apparatus of claim 1, further comprising a nozzle assembly in fluid communication with the first conduit inlet, wherein the nozzle assembly comprises:
a body;
a plurality of circumferentially spaced-apart apertures formed within the body; and
a plurality of passageways, each passageway in fluid communication with a respective aperture and with the first conduit fluid path.

11. The apparatus of claim 1, wherein the air source is configured to direct pulses of compressed air into the first conduit at a pressure of between 40 psi and 80 psi and in time intervals of between about 0.5 seconds and 2 seconds.

12. The apparatus of claim 1, further comprising a penetration stop secured to the first conduit, wherein the penetration stop rests on top of the layer of sediment in the first vessel and limits a distance the first conduit inlet extends into the layer of sediment.

13. The apparatus of claim 1, wherein the first conduit inlet extends into the layer of sediment.

14. The apparatus of claim 1, comprising a sixth conduit having an outlet positioned adjacent to the first conduit inlet and configured to deliver pressurized fluid adjacent the first conduit inlet.

15. The apparatus of claim 1, further comprising a sixth conduit having an outlet positioned adjacent to the first conduit inlet and configured to deliver pressurized air adjacent the first conduit inlet.

16. The apparatus of claim 1, wherein the sediment comprises abrasive material.

17. The apparatus of claim 16, wherein the abrasive material comprise garnet.

18. A method for removing sediment from a liquid contained within a first vessel, the method comprising:
directing pulses of pressurized air into a conduit having an inlet disposed within the first vessel adjacent to the sediment to cause a slurry of liquid and sediment to flow through the conduit into a second vessel elevated above the first vessel;
draining the slurry of liquid and sediment from the second vessel into a third vessel that is positioned at an elevation lower than the second vessel; and
draining liquid from the third vessel as sediment accumulates within the third vessel.

19. The method of claim 18, further comprising removing the third vessel when accumulation of sediment therewithin reaches a predetermined amount.

20. The method of claim 18, wherein the step of draining liquid from the third vessel comprises draining liquid into a fourth vessel that is in fluid communication with the first vessel.

21. The method of claim 18, further comprising periodically moving the conduit along a predetermined path within the first vessel.

22. The method of claim 21, wherein the conduit is periodically moved along the predetermined path impulsively in response to the pulses of pressurized air flowing through the conduit.

23. The method of claim 18, wherein the step of directing pulses of pressurized air into the conduit comprises directing air at a pressure of between 40 psi and 80 psi and in time intervals of between about 0.5 seconds and 2 seconds.

24. The method of claim 18, wherein the sediment comprises an abrasive material.

25. The method of claim 24, wherein the abrasive material comprises garnet.

26. The method of claim 18, wherein the liquid comprises water.

27. The method of claim 18, wherein the conduit inlet extends into the sediment.

28. The method of claim 18, further comprising directing pressurized air into the sediment adjacent to the conduit inlet substantially simultaneously with the step of directing pulses of pressurized air into the conduit.

29. The method of claim 18, further comprising directing pressurized fluid into the sediment adjacent to the conduit inlet substantially simultaneously with the step of directing pulses of pressurized air into the conduit.

30. An apparatus for removing sediment contained within a volume of liquid, comprising:
a vessel comprising an inlet and an outlet;
an elongated, substantially linear first conduit comprising an inlet and an outlet, wherein the first conduit inlet is configured to be positioned adjacent to a layer of sediment within a volume of liquid that is at an elevation lower than an elevation of the vessel, and wherein the first conduit outlet is in fluid communication with the vessel via the vessel inlet;

an air source that is configured to direct pulses of pressurized air into the first conduit to draw a slurry of liquid and sediment through the first conduit and into the vessel; and a second conduit in fluid communication with the vessel via the vessel outlet, wherein the second conduit is configured to drain a slurry of liquid and sediment from the vessel.

31. The apparatus of claim 30, wherein at least a portion of one or more of the first and second conduits is transparent such that flow therethrough can be observed.

32. The apparatus of claim 30, wherein the second conduit comprises flexible tubing.

33. The apparatus of claim 30, wherein the volume of liquid is contained within a tank, and wherein the apparatus comprises a support member that is configured to support the first conduit and vessel in a substantially vertical orientation within the tank.

34. The apparatus of claim 33, wherein the tank includes an elongated, generally horizontal member that extends between opposite sides of the tank, wherein the support member is configured to movably support the first conduit and vessel in a substantially vertical orientation within the tank via the elongated member.

35. The apparatus of claim 34, the tank elongated member has an upper surface with a first set of ratchet teeth disposed thereon, and wherein the support member comprises a second set of ratchet teeth configured to matingly engage the first set of ratchet teeth, and wherein the impulse experienced by the first conduit as a result of pulsed air flow through the first conduit causes the second set of ratchet teeth to move relative to the first set of ratchet teeth.

36. The apparatus of claim 30, further comprising a nozzle assembly in fluid communication with the first conduit inlet, wherein the nozzle assembly comprises:

a body;

a plurality of circumferentially, spaced-apart apertures formed within the body; and a plurality of passageways, each passageway in fluid communication with a respective aperture and with the first conduit inlet.

37. The apparatus of claim 30, wherein the air source is configured to direct pulses of compressed air into the first conduit at a pressure of between 40 psi and 80 psi and in time intervals of between about 0.5 seconds and 2 seconds.

38. The apparatus of claim 30, further comprising a clearing tube having an outlet positioned adjacent to the first conduit inlet and configured to deliver pressurized fluid or air adjacent the first conduit inlet.

* * * * *